(12) United States Patent
Wang et al.

(10) Patent No.: US 7,877,850 B2
(45) Date of Patent: Feb. 1, 2011

(54) METHOD FOR POSITIONING AND JOINING PANELS

(75) Inventors: Pei-Chung Wang, Troy, MI (US); Roland J. Menassa, Macomb, MI (US); James W. Wells, Rochester Hills, MI (US); John D. Fickes, Brighton, MI (US); Tommy Christensen, Vanersborg (SE)

(73) Assignee: GM Global Technology Operations LLC, Detroit, MI (US)

( * ) Notice: Subject to any disclaimer, the term of this patent is extended or adjusted under 35 U.S.C. 154(b) by 977 days.

(21) Appl. No.: 11/691,552

(22) Filed: Mar. 27, 2007

(65) Prior Publication Data

US 2008/0235932 A1  Oct. 2, 2008

(51) Int. Cl.
*B23Q 3/00* (2006.01)
(52) U.S. Cl. ....................................................... 29/464
(58) Field of Classification Search ................... 29/464, 29/428, 458, 460, 469, 523.13, 523.14, 527.2; 219/121.64, 121.6, 121.63, 121.66, 121.85, 219/171.1, 118, 69.15, 84, 86.12, 86.25, 219/161
See application file for complete search history.

(56) References Cited

U.S. PATENT DOCUMENTS

| | | | |
|---|---|---|---|
| 6,528,756 B2 | 3/2003 | Degawa et al. | |
| 6,646,221 B2 | 11/2003 | Wang | 219/118 |
| 6,703,583 B2 | 3/2004 | Menin | 219/121.64 |
| 7,633,032 B2 * | 12/2009 | Wang et al. | 219/86.22 |
| 2002/0121506 A1 | 9/2002 | Menin | 219/121.64 |
| 2007/0007253 A1 * | 1/2007 | Wang et al. | 219/86.25 |

FOREIGN PATENT DOCUMENTS

| | | |
|---|---|---|
| DE | 19512192 A1 | 10/1996 |
| DE | 10101415 C1 | 7/2002 |
| DE | 20200402016 U1 | 6/2006 |

* cited by examiner

*Primary Examiner*—John C Hong

(57) ABSTRACT

A method is provided for precisely positioning and joining first and second sheet panels. A first hole is extruded in the first panel with an annular upstanding wall surrounding the first hole. The first hole has a diameter to fit closely over the locating pin of a support. A second hole is formed in the second panel and has a diameter to fit closely over the annular upstanding wall of the first panel. A bond is created between the first and second panels adjacent to the annular upstanding wall, so that the annular upstanding wall protects the locating pin from being fouled by the bonding material. The bond may be either an adhesive bond or an electric resistance weld or both an adhesive bond and an electric resistance weld and the annular upstanding wall acts as a dam to protect the locating pin from the adhesive or weld splatter.

23 Claims, 4 Drawing Sheets

METHOD FOR POSITIONING AND JOINING PANELS

FIELD OF THE INVENTION

The present invention relates to a method for the improved locating and joining together of sheet panels

BACKGROUND OF THE INVENTION

It is known to join together sheet panels such as sheet metal panels by creating a resistance spot weld between the sheet panels or by adhesively bonding the sheet panels together. During the welding or adhesive bonding process it is necessary and desirable to clamp the sheet panels together at a precise position relative one another in order to achieve the desired accuracy in the finished sheet panel assembly. It is known that the accuracy of the positioning of the sheet panels can be accomplished by providing locating holes in each of the panels and then seating the panels on a locating pin that extends through the holes. The desired accuracy in the finished panel assembly is also improved by making the weld or the adhesive bond directly adjacent the locating pin, however; in that case, any adhesive overflow or weld splatter will foul the locating pin.

It would be desirable to provide improvements in the known method for positioning and clamping and joining panels together.

SUMMARY OF THE INVENTION

A method is provided for precisely positioning and joining first and second sheet panels. A first hole is extruded in the first panel with an annular upstanding wall surrounding the first hole. The first hole has a diameter to fit closely over the locating pin of a support. A second hole is formed in the second panel and has a diameter to fit closely over the annular upstanding wall of the first panel. A bond is created between the first and second panels adjacent to the annular upstanding wall, so that the annular upstanding wall protects the locating pin from being fouled by the bonding material. The bond may be either an adhesive sealer bond or an electric resistance weld or both an adhesive sealer bond and an electric resistance weld and the annular upstanding wall acts as a dam to protect the locating pin from the adhesive or weld splatter.

Further areas of applicability of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE EXEMPLARY EMBODIMENTS

The following description of certain exemplary embodiments is merely exemplary in nature and is not intended to limit the invention, its application, or uses.

Figure 1:
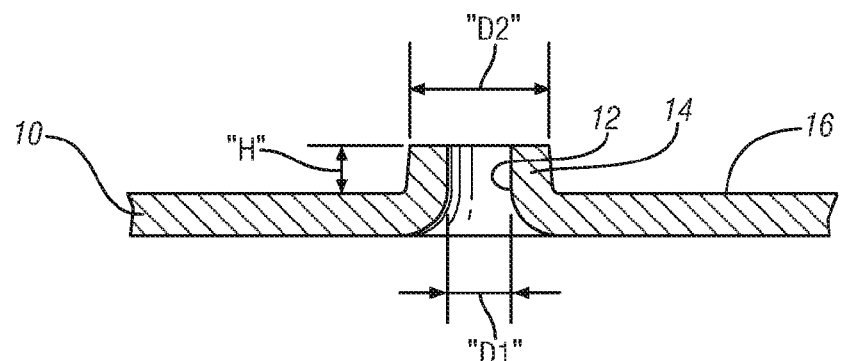
FIG. 1 is a section view taken through a sheet panel having an extruded hole.

Referring to FIG. 1, a first sheet panel 10 is provided with an extruded hole 12 that has an annular upstanding wall 14 surrounding the hole 12 and projecting upward from an upper surface 16 of the first sheet panel 10. The hole 12 has a diameter "D1". The upstanding wall 14 has a height "H" and an outer diameter "D2".

Figure 2:
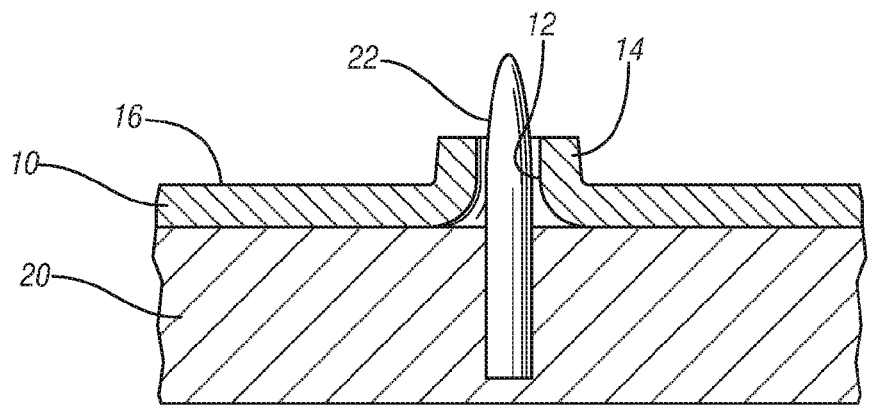
FIG. 2 is a section view showing the sheet panel of FIG. 1 seated on a support and a locating pin.

FIG. 2 shows a support 20 having a locating pin 22 that projects upwardly from the support 20. The support 20 is steel, copper or other electrical conductive material. The locating pin 22 may be of electrically conductive material or of a dielectric material such as nylon or plastic. As shown in FIG. 2, the first sheet panel 10 is placed upon the support 20 with the locating pin 22 reaching through the extruded hole 12. The locating pin 22 is only slightly less in diameter than the diameter "D1" of the extruded hole 12 so that the first sheet panel 10 will be precisely located upon the support 20. For clarity, the drawings show the extruded hole as being larger than the diameter of the locating pin 22, however, it will be understood that the first sheet panel 10 is most accurately positioned by having the extruded hole 12 fit properly over the locating pin 22.

Figure 3:
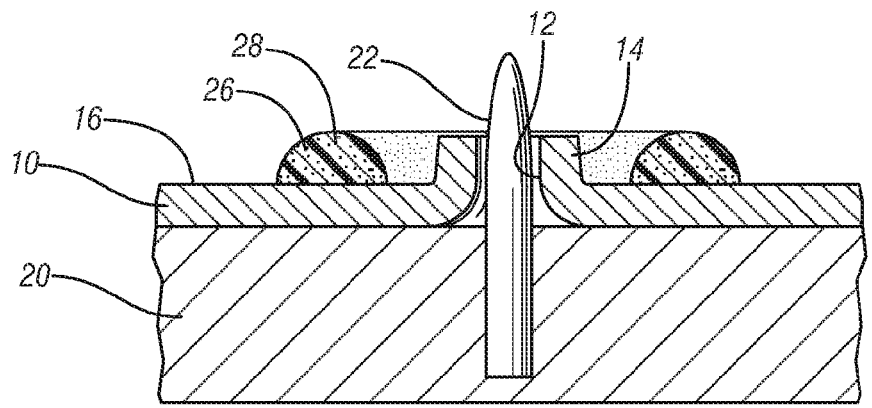
FIG. 3 is a section view showing an annular bead of adhesive/sealer dispensed onto the sheet panel of FIG. 2.

As seen in FIG. 3, a bead 26 of adhesive 28 is dispensed onto the first sheet panel 10, preferably as an annulus of adhesive that encircles the extruded hole 12 and upstanding wall 14.

Figure 4:
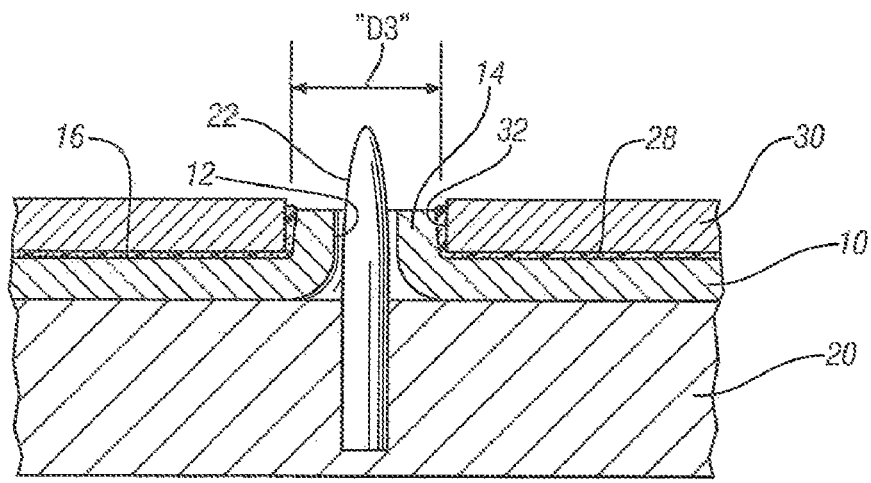
FIG. 4 is a section view showing a second sheet panel laid atop the first sheet panel of FIG. 3.

In FIG. 4, it is seen that a second sheet panel 30 is placed atop the first sheet panel 10. The second sheet panel 30 has a hole 32 therein having a diameter "D3" that is only slightly larger than the outer diameter "D2" of the annular upstanding wall 14. Thus the hole 32 fits properly over the annular upstanding wall 14 so that the interfit between the hole 32 and the annular upstanding wall 14 will precisely position the second sheet panel 30 upon the first sheet panel 10.

Figure 5:
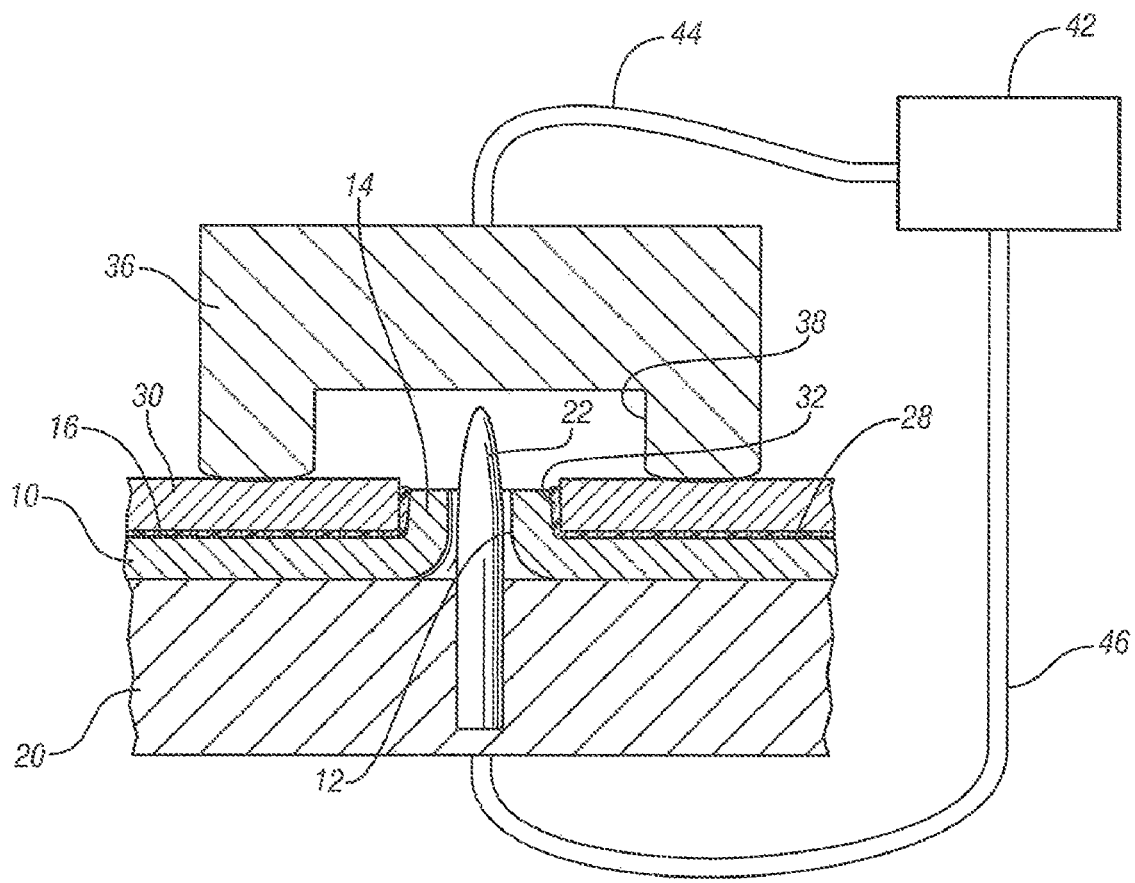
FIG. 5 is section view showing an electrode engaging the second metal panel to cure the adhesive.

Referring to FIG. 5, an electrode 36 is lowered onto the second sheet panel 30. The electrode 36 is preferably of annular cylindrical shape and has a central opening 38 by which the electrode 36 is assured to contact with and rest upon the second sheet panel 30 while remaining clear of contact with and surrounding the locating pin 22. The electrode 36 is pressed against the second sheet panel 30 with sufficient force to properly seat the second sheet panel 30 onto the first sheet panel 10 by squeezing and spreading the adhesive 28. It will be appreciated that the upstanding wall 14 will function as a dam to prevent the flow of adhesive 28 from contacting and fouling the locating pin 22. The electrode 36 is connected to a current source 42 by a cable 44. The support 20 is connected to the current source 42 by a cable 46. When electrical current is conducted to the electrode 36 and the support 20, electric resistance heating is created so that the region of the sheet panels 10 and 30 underlying the electrode 36 will be heated and the heat will cure the adhesive 28 to join the sheet panels together.

Figure 6:
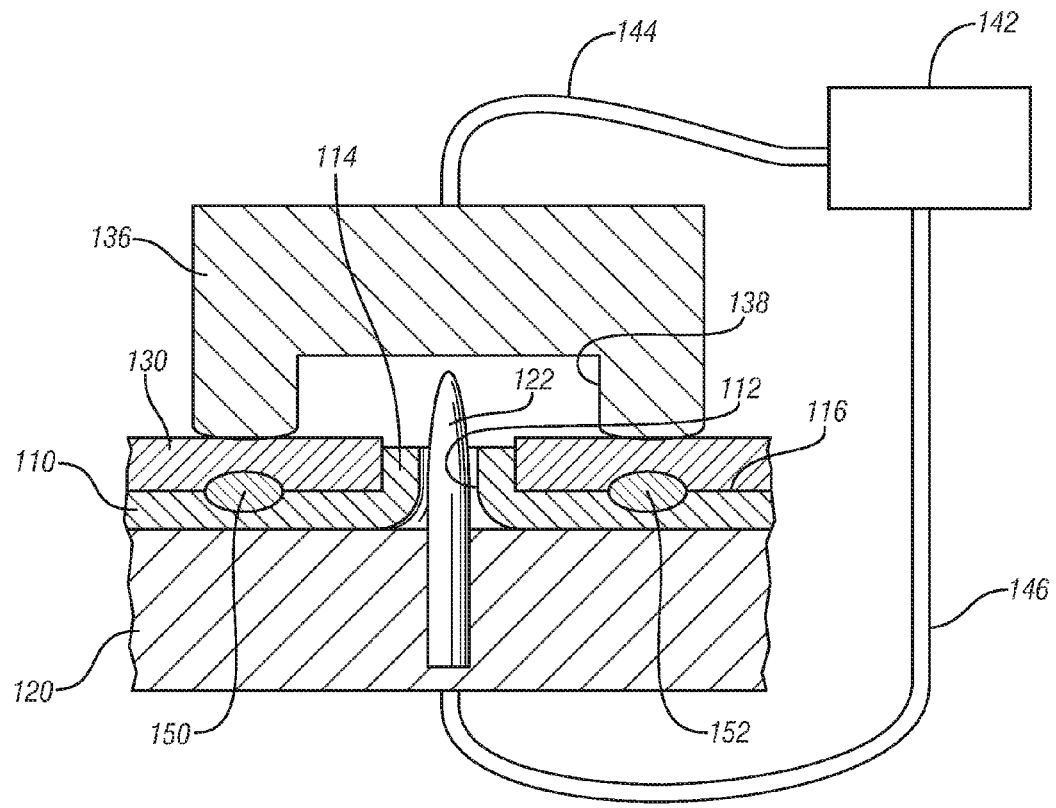
FIG. 6 is a section view showing another embodiment of the invention in which an electrode created an electric resistance weld.

FIG. 6 shows another embodiment of the invention. In FIG. 6, the first sheet panel 110 is provided with an extruded hole 112 that has an annular upstanding wall 114 surrounding the hole 112 and projecting upward from an upper surface 116 of the first sheet panel 110. The first sheet panel 110 rests upon support 120. The support 120 has a locating pin 122 that extends through the hole 112. Second sheet panel 130 is placed directly atop the first sheet panel 110 without the dispensing of any adhesive. The electrical current that is applied to the electrode 136 through cables 144 and 146 is at a level and duration that will heat the first sheet panel 110 and the second sheet panel 130 and form an annular-shaped electric resistance weld, shown at weld beads 150 and 152, between the first sheet panel 110 and the second sheet panel 130. The annular upstanding wall 114 acts a dam to prevent any weld splatter that is created during the creation of the electric resistance weld from reaching the locating pin 122.

Figure 7:
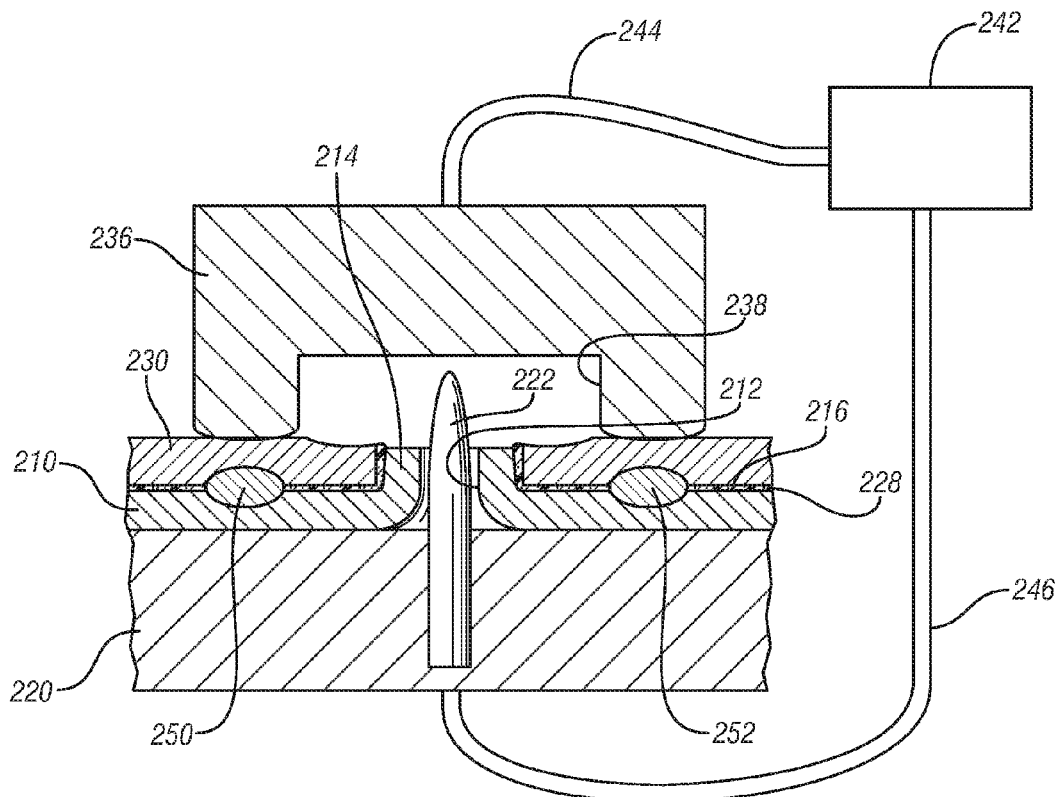
FIG. 7 is a section view showing another embodiment of the invention in which an electrode both created an electric resistance weld and cured an adhesive.

FIG. 7 shows another embodiment of the invention. In FIG. 7, a first sheet panel 210 is provided with an extruded hole 212 that has an annular upstanding wall 214 surrounding the hole 212 and projecting upward from an upper surface 216 of the first sheet panel 210. The first sheet panel 210 rests upon support 220. The support 220 has a locating pin 222 that extends through the hole 212. Second sheet panel 230 is placed atop the bead of adhesive 228 that was dispensed onto the first sheet panel 210. The electrical current that is applied to the electrode 236 through cables 244 and 246 is at a level and duration that will form electric resistance welds 250 and 252 between the first sheet panel 210 and the second sheet panel 230 and also heat the first and second sheet panels 210 and 230 to cure the adhesive 228 so that the panels are joined together by both the adhesive bond and the electric resistance weld bond. The annular upstanding wall 214 acts as a dam to prevent any adhesive or any weld splatter that is created during the creation of the electric resistance weld from reaching the locating pin 222.

Figure 8:
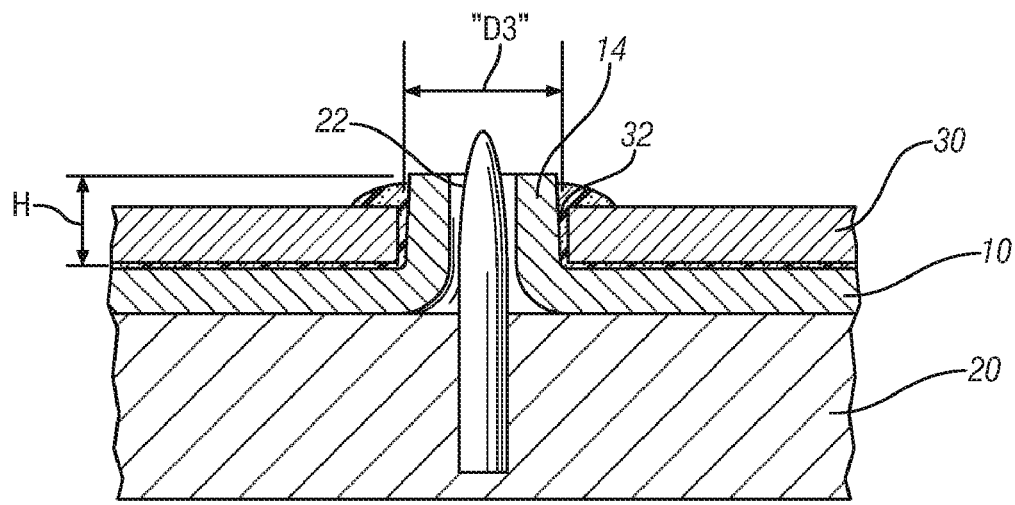
FIG. 8 is section view showing another embodiment of the invention in which the extruded hole has an upstanding wall of greater height; and, FIG. 9 is a section view showing another embodiment of the invention in which a tool has deformed the upstanding wall to form a mechanical lock between the first and second sheet panels.

Referring again to FIGS. 1 and 4, it will be seen and understood that the height of the upstanding wall 14 of extruded hole 12 may be varied to control the extent by which the upstanding wall 14 acts as a dam against the passage of weld splatter or adhesive. For example, in FIGS. 1 and 4, it is seen that the height "H" of the upstanding wall 14 is approximately equal to the thickness of the second sheet panel 30 so that the top of the dam is about flush with the top of the second sheet panel 30. In FIG. 8, the height "H" of the upstanding wall 14 is greater than the thickness of the second sheet panel 30 so that any excess adhesive 32 or weld splatter will overflow onto the second sheet panel 30 rather than toward the locating pin 22.

Figure 9:
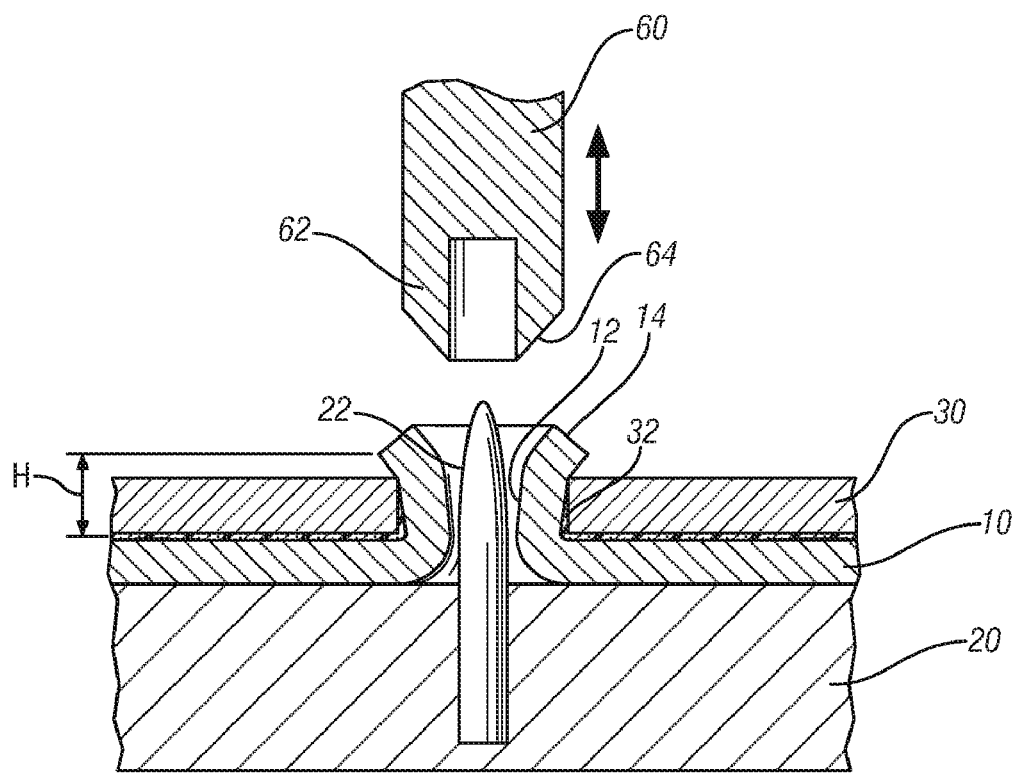

Referring to FIG. 9, it is seen that the height of the upstanding wall 14 is greater than the thickness of the second sheet panel 30. In addition, FIG. 9 shows a tool 60 having a hollow annular point 62 with a circumferential flared chisel face 64. The tool 60 has been lowered into the hole 12 of the first panel 10 and then raised again, to deform the uppermost portion of the upstanding wall 14 into engagement with the second sheet panel 30. The tool 60 can be incorporated into the electrode, or the tool 60 can be a separate mechanism from the electrode. In FIG. 9 the chisel face 64 has deformed the upstanding wall 14 by wrapping the uppermost portion of the upstanding wall 14 down into engagement with the second sheet panel 30. Alternatively, in those instances where the upstanding wall 14 is of a lesser height than shown in FIG. 9, the chisel face 64 will deform the upstanding wall 14 radially outward to engage with the walls of the hole 32 in the second sheet panel 30. Thus the first sheet panel and the second sheet panel are mechanically locked together, in addition to the attachment provided by the adhesive and/or the electric resistance weld. And this mechanical lock can be performed before, after, or during the formation of the adhesive and/or electric resistance weld.

Although the drawings, FIGS. 5, 6, and 7 herein, show the electrode as having a cylindrical hollow donut shape with a central opening 38 to encircle the locating pin 22 and thereby create an annular shaped heating pattern in the panels, the electrode can be of any known shape. For example the electrode can be a single point electrode that is applied close to one side of the annular upstanding wall of the first panel, or two or more such electrodes can be arrayed as desired near the annular upstanding wall so that the annular upstanding wall will act as a dam against the adhesive or weld splatter.

Although the drawings show the example of a round locating pin, a round annular extruded wall, and a round hole in the second panel, it will be understood that other cross-sectional shapes such as oval or square or rectangular could be employed. In addition, although the drawings show the example of two stacked panels, the invention can also be employed to join three or more stacked panels.

What is claimed is:

1. A method for positioning and joining together first and second sheet panels, comprising:
   providing a support having a locating pin;
   extruding a first hole in the first panel with an annular upstanding wall surrounding the hole, said first hole having a diameter sized to fit closely over the locating pin;
   forming a second hole in the second panel that has a diameter sized to fit closely over the annular upstanding wall of the first panel;
   placing the first panel upon the support with the first hole of the first panel fitting on the locating pin;
   placing the second panel atop the first panel with the second hole of the second panel fitting onto the annular upstanding wall;
   and creating a bond between the first and second panels adjacent to the annular upstanding wall, so that the annular upstanding wall protects the locating pin from being fouled by the bond.

2. The method of claim 1 further comprising the bond being an adhesive/sealer bond created by placing a bead of adhesive/sealer between the first and second panel and then applying pressure and heat to cure the adhesive/sealer, said annular upstanding wall providing a dam to prevent the adhesive/sealer from contacting with the locating pin.

3. The method of claim 1 further comprising the bond being created by placing an annular ring of adhesive onto the first panel surrounding the annular upstanding wall prior to placing the second panel atop the first panel, and then pressing an annular electrode onto the second panel to squeeze and spread the adhesive and applying current through the electrode to create electric resistance heating and cure the adhesive while the annular upstanding wall prevents the adhesive from contacting with the locating pin.

4. The method of claim 1 further comprising the bond being an electric resistance weld, said annular upstanding wall providing a dam to prevent weld splatter from contacting with the locating pin.

5. The method of claim 1 further comprising the bond being created by placing an annular electrode onto the second panel to squeeze the first and second panels together and applying current through the electrode to create an electric resistance weld between the first and second panels while the upstanding wall prevents any weld splatter from contacting with the locating pin.

6. The method of claim 1 further comprising the bond being both an adhesive bond created by placing a bead of adhesive between the first and second panel and an electric resistance weld bond, said annular upstanding wall providing a dam to prevent adhesive or weld splatter from contacting with the locating pin.

7. The method of claim 1 further comprising the bond being created by placing an annular ring of adhesive onto the first panel surrounding the annular upstanding wall prior to placing the second panel atop the first panel, and then pressing an annular electrode onto the second panel to squeeze the adhesive and applying current through the electrode to create electric resistance heating and cure the adhesive and also create an electric resistance weld between the first panel and the second panel while the annular upstanding wall prevents the adhesive from contacting with the locating pin.

8. The method of claim 1 further comprising the annular upstanding wall having a height above the first panel that is approximately the same height as the thickness of the second panel.

9. The method of claim 1 further comprising the annular upstanding wall having a height above the first panel that is greater than the thickness of the second panel.

10. The method of claim 1 further comprising deforming the upstanding wall into engagement with the second panel.

11. A method for locating and joining together first and second sheet panels, comprising:
providing a support having a locating pin;
extruding a first hole in the first panel with an annular upstanding wall surrounding the first hole, said first hole having a diameter sized to fit closely over the locating pin so that upon placing the first panel upon the support the locating pin precisely locates the first panel relative to the support;
placing a bead of adhesive onto the first panel adjacent to the annular upstanding wall;
forming a second hole in the second panel that has a diameter sized to fit closely over the annular upstanding wall of the first panel and placing the second panel upon the first panel with the second hole of the second panel receiving the annular upstanding wall so that the second panel is precisely located relative to the first panel by the annular upstanding wall;
applying an electrode to the second panel adjacent to the second hole to squeeze the panels and spread the adhesive;
and applying electrical current to the electrode to cure the adhesive, said annular upstanding wall providing a dam and preventing the adhesive from fouling the support pin.

12. The method of claim 11 further comprising the annular upstanding wall having a height that is approximately the same height as the thickness of the second panel.

13. The method of claim 11 further comprising the annular upstanding wall having a height that is greater than the thickness of the second panel.

14. The method of claim 11 further comprising the bead of adhesive being an annular bead of adhesive that is applied to closely surround the annular upstanding wall.

15. The method of claim 14 further comprising the electrode being of annular shape to overlie the annular bead of adhesive and surround the locating pin.

16. The method of claim 15 further comprising the electrode causing sufficient heating of the first and second panels to also create an electric resistance weld between the first and second panels in addition to the joining together of the first and second panels by the curing of the adhesive.

17. The method of claim 11 further comprising deforming the upstanding wall into engagement with the second panel.

18. A method for positioning and joining together first and second sheet panels, comprising:
providing a support having a locating pin;
extruding a first hole in the first panel with an annular upstanding wall surrounding the first hole, said first hole having a diameter sized to fit closely over the locating pin so that upon placing the first panel upon the support the locating pin precisely locates the first panel relative to the support;
forming a second hole in the second panel that has a diameter sized to fit closely over the annular upstanding wall of the first panel and placing the second panel upon the first panel with the second hole of the second panel receiving the annular upstanding wall so that the second panel is precisely located relative to the first panel by the annular upstanding wall;
applying an electrode to the second panel adjacent to the second hole to squeeze the panels and applying electrical current to the electrode to heat the first and second panels and create an electric resistance weld adjacent to the annular upstanding wall, said annular upstanding wall providing a dam and preventing any weld splatter from fouling the support pin.

19. The method of claim 18 further comprising the annular upstanding wall having a height that is approximately the same height as the thickness of the second panel.

20. The method of claim 18 further comprising the annular upstanding wall having a height that is greater than the thickness of the second panel.

21. The method of claim 18 further comprising the electrode being of annular shape to surround the locating pin and the annular upstanding wall so that the electric resistance weld is of annular shape and surrounds the annular upstanding wall.

22. The method of claim 18 further comprising the placing an annular ring of adhesive onto the first panel surrounding the annular upstanding wall prior to placing the second panel atop the first panel so that the heating of the first and second panels cures the adhesive while the annular upstanding wall prevents the adhesive from contacting with the locating pin.

23. The method of claim 18 further comprising lowering a tool into the first hole of the first panel to deform the upstanding wall into engagement with the second panel and thereby mechanically lock the first and second panels together.

* * * * *